United States Patent
Herrmann et al.

(10) Patent No.: US 10,439,386 B2
(45) Date of Patent: Oct. 8, 2019

(54) PROTECTION METHOD FOR PROTECTING A GENERATOR OR POWER STATION UNIT AND PROTECTIVE DEVICE FOR CARRYING OUT SUCH A METHOD

(71) Applicant: SIEMENS AKTIENGESELLSCHAFT, Munich (DE)

(72) Inventors: Hans-Joachim Herrmann, Markt Erlbach (DE); Kai Trunk, Erlangen (DE); Edmund Eisenburger, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 16 days.

(21) Appl. No.: 15/678,526

(22) Filed: Aug. 16, 2017

(65) Prior Publication Data

US 2018/0054051 A1 Feb. 22, 2018

(30) Foreign Application Priority Data

Aug. 16, 2016 (EP) .................... 16184321

(51) Int. Cl.
*H02H 3/16* (2006.01)
*H02H 1/00* (2006.01)
(Continued)

(52) U.S. Cl.
CPC ............ *H02H 3/16* (2013.01); *H02H 1/0007* (2013.01); *H02H 3/006* (2013.01); *H02H 3/027* (2013.01);
(Continued)

(58) Field of Classification Search
CPC ........ H02H 3/40; H02H 1/0061; H02H 3/021; G05B 13/02
See application file for complete search history.

(56) References Cited

U.S. PATENT DOCUMENTS

| | | | |
|---|---|---|---|
| 6,501,628 B1 * | 12/2002 | Namba | .................. H02H 3/021 307/43 |
| 7,759,913 B2 * | 7/2010 | Labuschagne | ............ G05F 1/12 307/50 |

(Continued)

FOREIGN PATENT DOCUMENTS

| | | |
|---|---|---|
| CN | 102324730 A | 1/2012 |
| CN | 202190057 U | 4/2012 |

(Continued)

OTHER PUBLICATIONS

Siemens AG "SIPROTEC Multifunctional Machine Protection 7UM62" V4.6, Manual, Release date: Mar. 2010, Order No. C53000-G1176-C147-7; 2010.

(Continued)

*Primary Examiner* — Rina I Duda
(74) *Attorney, Agent, or Firm* — Laurence Greenberg; Werner Stemer; Ralph Locher

(57) ABSTRACT

A method protects an electrical generator or power station unit connected to a power distribution network or to a power transmission line. A short circuit near the generator in the power distribution network or on the power transmission line is detected, and a short-circuit detection signal is generated, when a set of predetermined trigger conditions is satisfied. The electrical generator is disconnected from the network or line if, after generation of the short-circuit detection signal, the trigger conditions are satisfied at the instant when a predetermined delay time elapses, and have remained satisfied until the predetermined delay time elapses. The delay time is a variable duration which is reestablished regularly or irregularly before it elapses, as a function of the operating profile after the short-circuit occurrence, and the generator is disconnected if the trigger (Continued)

conditions are satisfied at the instant when the delay time elapses.

16 Claims, 4 Drawing Sheets

(51) Int. Cl.

| | | |
|---|---|---|
| *H02H 3/027* | (2006.01) | |
| *H02H 7/06* | (2006.01) | |
| *H02H 3/00* | (2006.01) | |
| *H02H 3/093* | (2006.01) | |
| *H02H 3/10* | (2006.01) | |
| *H02H 3/42* | (2006.01) | |
| *H02H 3/44* | (2006.01) | |
| *H02H 7/22* | (2006.01) | |
| *H02J 13/00* | (2006.01) | |
| *H02J 3/38* | (2006.01) | |
| *H02H 1/04* | (2006.01) | |
| *H02H 7/26* | (2006.01) | |
| *H02P 9/00* | (2006.01) | |

(52) U.S. Cl.
CPC .............. *H02H 3/093* (2013.01); *H02H 3/10* (2013.01); *H02H 3/42* (2013.01); *H02H 3/44* (2013.01); *H02H 7/06* (2013.01); *H02H 7/22* (2013.01); *H02J 3/38* (2013.01); *H02J 13/0013* (2013.01); *H02H 1/04* (2013.01); *H02H 7/26* (2013.01); *H02P 9/006* (2013.01); *Y02E 40/72* (2013.01); *Y02E 60/725* (2013.01); *Y02E 60/7807* (2013.01); *Y04S 10/12* (2013.01); *Y04S 10/20* (2013.01); *Y04S 40/12* (2013.01)

(56) References Cited

U.S. PATENT DOCUMENTS

| | | | |
|---|---|---|---|
| 2010/0039741 A1* | 2/2010 | Booth | ................ H02H 1/0061 361/63 |
| 2014/0100702 A1* | 4/2014 | Schweitzer, III | ...... G05B 13/02 700/286 |
| 2014/0240881 A1* | 8/2014 | Brombach | ............... H02H 3/40 361/65 |

FOREIGN PATENT DOCUMENTS

| | | |
|---|---|---|
| CN | 104538928 A | 4/2015 |
| DE | 102010042609 A1 | 4/2012 |
| DE | 102011115243 A1 | 3/2013 |

OTHER PUBLICATIONS

Lou Lingjiao et al.: "Fast Protection of Failures in Generator Static Excitation System", Automation of Electric Sower Systems, vol. 38, No. 22 pp. 103-107 (Nov. 25, 2014)—English abstract on p. 107.

\* cited by examiner

PROTECTION METHOD FOR PROTECTING A GENERATOR OR POWER STATION UNIT AND PROTECTIVE DEVICE FOR CARRYING OUT SUCH A METHOD

CROSS-REFERENCE TO RELATED APPLICATION

This application claims the priority, under 35 U.S.C. § 119, of European application EP 16184321.4, filed Aug. 16, 2016; the prior application is herewith incorporated by reference in its entirety.

BACKGROUND OF THE INVENTION

Field of the Invention

The invention relates to a protection method for protecting an electrical generator or power station unit connected to a power distribution network or to a power transmission line.

Such a protection method is known, for example, from the Siemens SIPROTEC 7UM62 protection device. In the previously known method, a short circuit near the generator in the power distribution network or on the power transmission line is detected, and a short-circuit detection signal is generated, when a set of predetermined trigger conditions is satisfied. The generator is disconnected from the power distribution network or the power transmission line if, after generation of the short-circuit detection signal, the trigger conditions are still satisfied at the instant when a predetermined delay time elapses.

SUMMARY OF THE INVENTION

The object of the invention is to provide a protection method which allows good protection of the generator or power station unit and at the same time avoids premature disconnection of the generator or power station unit from the network.

Correspondingly, according to the invention a delay time is a variable duration which is reestablished regularly or irregularly before it elapses, as a function of the operating profile after the short-circuit occurrence, and the generator is disconnected from the power distribution network or the power transmission line if the trigger conditions are satisfied at the instant when the respectively currently established delay time elapses.

One essential advantage of the method according to the invention is that it very straightforwardly makes it possible, for example, to take into account the magnitude of the active power reduction after the occurrence of a short circuit. If a short circuit occurs, the active power output of the generator is reduced abruptly; the result of this in turn is that the angular velocity of the rotor of the generator changes linearly, and the angular displacement increases with the second power of the fault duration. If the voltage at the network connection point does not collapse entirely, however, i.e. if a fault with a residual voltage occurs, active power can still be delivered to the network during the fault, and the rise in the angular displacement is slower. The measure, provided according to the invention, of adapting the delay time operation-dependently, i.e. not using a rigidly predetermined delay time, but a variable one, which takes into account the operating conditions after the short circuit, is based on this discovery by the inventor. In other words, the decision whether disconnection of the generator or power station unit from the power distribution network or the power transmission line should or should not take place can be made operation-dependently. By using for example the active power development and by providing a variable delay time, it is for example advantageously possible to prevent the generator or power station unit being disconnected from the network too early or too late: for example, in the event of a short circuit in which only a low short-circuit current occurs and the angular displacement of the rotor increases only slowly, the generator may remain connected to the network for a longer time than in the case of a high short-circuit current, which in turn increases the possibility that the short circuit may be rectified before disconnection from the network has to be carried out.

Preferably, a timer is started when the short-circuit detection signal occurs, either immediately after the occurrence of the short-circuit detection signal or at a predetermined instant thereafter. The generator is preferably disconnected from the power distribution network or the power transmission line if a time indication output by the timer corresponds to or exceeds the currently established delay time and the trigger conditions are satisfied at this instant.

It is advantageous for the delay time to be established as a function of the respective power difference between the power before detection of the short circuit, in particular before generation of the short-circuit detection signal, and the power at the respective current instant.

In particular, it is advantageous for the delay time to be established as a function of the respective active power difference between the active power before detection of the short circuit, in particular before generation of the short-circuit detection signal, and the active power at the respective current instant. As already mentioned above, the active power reduction is a direct measure of respective fault angular displacement of the rotor, so that the active power take-off is particularly suitable for being used as a criterion for the breaking instant.

The delay time is preferably established by applying or reading out a predetermined formula, a predetermined characteristic or a predetermined table which establishes a relationship between a difference value indicating the respective power difference or active power difference and the predetermined delay time corresponding thereto.

According to one preferred method variant, the timer is started upon occurrence of the short-circuit detection signal. A stopping and/or resetting of the timer is suppressed when, at a predetermined subsequent instant after generation of the short-circuit detection signal, the short-circuit detection signal is still present at the predetermined subsequent instant and the active power has in the meantime dropped by more than a predetermined extent, and in particular when a derivative value indicating the mathematical time derivative of the active power as a function of time has fallen below a predetermined negative threshold value; otherwise the timer is stopped and/or reset.

According to another preferred method variant, the timer is started with a delay, specifically at a predetermined subsequent instant after generation of the short-circuit detection signal, when the short-circuit detection signal is still present at the predetermined subsequent instant and the active power has in the meantime dropped by more than a predetermined extent, and in particular when a derivative value indicating the mathematical time derivative of the active power as a function of time has fallen below a predetermined negative threshold value; otherwise the timer is not started.

The set of predetermined trigger conditions preferably contains one, several or all of the following trigger conditions:

a) the trigger condition that the positive-sequence voltage falls below a minimum predetermined positive-sequence voltage value, b) the trigger condition that the phase currents, or at least one thereof, exceed a predetermined maximum phase current value, c) the trigger condition that the active power falls below a predetermined minimum active power value, d) the trigger condition the active power has reached or exceeded a predetermined active-power setpoint value at a previous instant before the occurrence of one, several or all of the other trigger conditions, and e) the trigger condition that the three phase-to-phase voltages, also known as the voltage between phases, fall below a minimum voltage value.

The invention furthermore relates to a protective device for protecting an electrical generator or power station unit connected to a power distribution network or to a power transmission line. The protective device contains: a short-circuit detection module, which detects a short circuit in the power distribution network or on the power transmission line and generates a short-circuit detection signal when a set of predetermined trigger conditions is satisfied, and a breaking module, which disconnects the generator from the power distribution network or the power transmission line, or generates a breaking signal which initiates this, if, after generation of the short-circuit detection signal, the trigger conditions are satisfied at the instant when a predetermined delay time elapses, and in particular have remained satisfied until the predetermined delay time elapses.

In relation to such a protective device, according to the invention a delay time determination module is provided, which reestablishes the delay time as a variable duration regularly or irregularly before it elapses, as a function of the operating profile after the short-circuit occurrence, and the breaking module disconnects the generator or power station unit from the power distribution network or the power transmission line, or generates a breaking signal which initiates this, if the trigger conditions are satisfied at the instant when the respectively currently established delay time elapses.

In relation to the advantages of the protective device according to the invention, reference is made to the explanations above in connection with the method according to the invention.

It is regarded as advantageous if the protective device contains a computing device, and the short-circuit detection module, the delay time determination module and the breaking module are software modules, with which the computing device is programmed.

Other features which are considered as characteristic for the invention are set forth in the appended claims.

Although the invention is illustrated and described herein as embodied in a protection method for protecting a generator or power station unit and a protective device for carrying out such a method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, for the sake of clarity, the same references are always used for components which are identical or similar.

Figure 1:
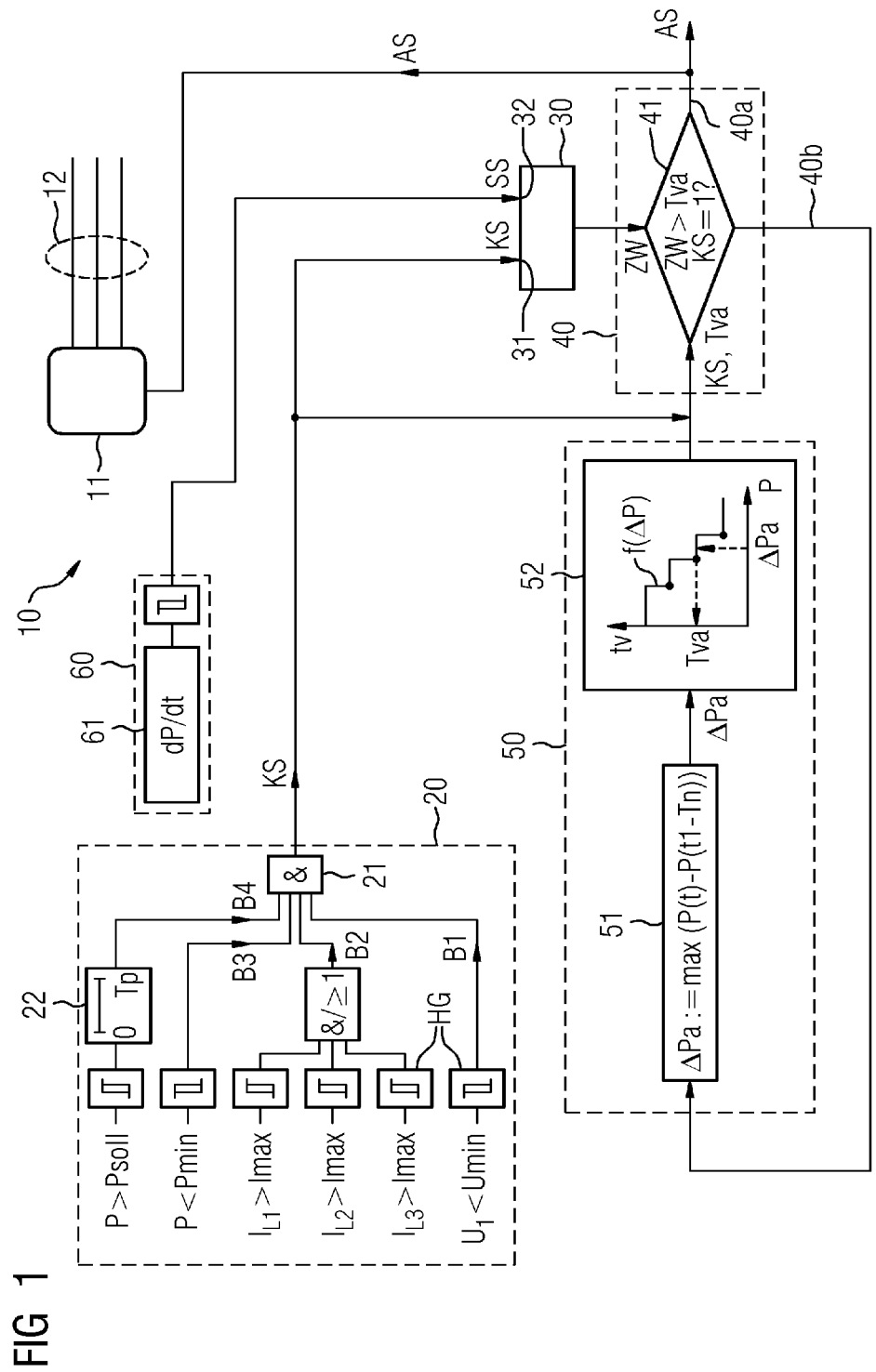
FIG. 1 is an illustration showing a first exemplary embodiment of a protective device according to the invention, with an aid of which an exemplary embodiment of a protection method according to the invention will also be explained.

Referring now to the figures of the drawings in detail and first, particularly to FIG. 1 thereof, there is shown a protective device 10, which is suitable for protecting an electrical generator or power station unit connected to a power distribution network or to a power transmission line. By way of example, it will be assumed below that the protective device 10 protects a generator 11 which is connected to a power distribution network 12.

The protective device 10 contains a short-circuit detection module 20. A logical AND element 21 of the short-circuit detection module 20 generates a short-circuit detection signal KS as output when a set of predetermined trigger conditions is satisfied. In the exemplary embodiment according to FIG. 1, it is assumed by way of example that the logical AND element 21 generates the short-circuit detection signal KS when four trigger conditions B1, B2, B3 and B4 exist.

The trigger condition B1 is considered to be fulfilled when the positive-sequence voltage U1 of the power distribution network 12 falls below a predetermined minimum positive-sequence voltage value Umin.

The trigger condition B2 is considered to be fulfilled when the phase currents $I_{L1}$, $L_{L2}$ and $I_{L3}$ of the power distribution network 12 respectively exceed a predetermined maximum phase current value Imax. As an alternative, provision may be made that the trigger condition B2 is considered to be fulfilled when at least one of the phase currents $I_{L1}$, $I_{L2}$ Land $I_{L3}$ exceeds the predetermined maximum phase current value Imax.

The trigger condition B3 is considered to be fulfilled when the active power P which the generator 11 is currently delivering to the power distribution network 12 falls below a predetermined minimum active power value Pmin.

The trigger condition B4 is considered to be fulfilled when the active power P generated by the generator or power station unit has reached or exceeded a predetermined active-power setpoint value Psoll at a previous instant. The previous instant lies at a predetermined duration Tp before the respective current observation instant, at which the existence of the other trigger conditions B1 to B3 is checked. For checking the trigger condition B4, a release delay element 22, which carries out the corresponding delay by the duration Tp, is preferably used. The duration Tp may, for example, be equal to a few network periods and is preferably longer than the maximum possible delay time Tva which the time determination element 52 outputs, or can output.

The short-circuit detection module 20 is connected at its output to a start input 31 of a timer 30. When the short-circuit detection signal KS is generated by the short-circuit detection module 20 and delivered to the start input 31, the timer 30 is started.

Arranged after the timer 30, there is a breaking module 40, which is equipped with an elapse checking module 41. The elapse checking module 41 receives at its input a time value ZW, which forms a time indication and is delivered to the breaking module 40 by the timer 30.

A delay time determination module 50 and the short-circuit detection module 20 are furthermore connected to the breaking module 40.

The delay time determination module 50 contains a differencing element 51, which generates an active power difference value ΔPa according to the following formula:

$$\Delta Pa = \max(P(t) - P(t1-Tn)),$$

where P(t) indicates the active power at the respective operating instant of the protective device 10, or of the generator 11, and P(t1–Tn) indicates the active power at a preceding instant t1–Tn. The instant t1 in this case indicates the instant at which the short-circuit generation signal KS is generated. Tn denotes a rigidly predetermined duration, which may for example be the network period length of the power distribution network 11. P(t1–Tn) therefore denotes the active power which the generator 11 generated at an instant which lay before the instant t1 at which the short-circuit generation signal KS was generated, specifically the duration Tn before.

Arranged after the differencing element 51, there is a time determination element 52 of the delay time determination module 50. A characteristic f(ΔP), which establishes a rigidly predetermined relationship between the active power difference value ΔPa respectively established by the differencing element 51 and a delay time Tva, on which the elapse checking module 41 of the breaking module 40 is intended to be based, is stored in the time determination element 52.

The timer 30 furthermore contains a stop input 32, to which a power change checking module 60 is connected. By applying a stop signal SS to the stop input 32 of the timer 30, the timer 30 can be stopped and reset, or set to zero.

The power change checking module 60 contains a change detection module 61, which forms the mathematical time derivative of the active power P as a function of time t and a corresponding derivative value dP/dt. If there is a short circuit, the active power will decrease abruptly and a derivative value dP/dt which falls below a predetermined negative threshold will occur. If the negative threshold is fallen below, the power change checking module 60 therefore assumes that there is in fact a short circuit and does nothing, and allows the timer 30 to continue.

Otherwise, i.e. if a sufficiently large negative active power change has not been detected, the power change checking module 60 assumes that there is not a short circuit. In this case, it generates a stop signal SS and delivers this to the stop input 32 of the timer 30, so that the timer is stopped and the output of a breaking signal AS by the breaking module is stopped.

The power change checking module 60 preferably carries out the check as to whether the derivative value dP/dt falls below or has fallen below the predetermined negative threshold after the generation of the short-circuit detection signal KS, for example within a duration between t1 and t1+Tn or at the instant t1+Tn, where Tn—as mentioned above—may be the period of the network frequency.

FIG. 1 represents by way of example a multiplicity of hysteresis elements HG, which are used when checking the trigger conditions B1, B2, B3, B4 and when generating the stop signal SS. The hysteresis elements HG are used to avoid "oscillation" of the protective device 10.

The protective device 10 according to FIG. 1 may be operated as now described.

The short-circuit detection module 20 evaluates the measurement values applied to its input, i.e. the positive-sequence voltage U1, the phase currents $I_{L1}$, $I_{L2}$ and $I_{L3}$ and the active power P, and generates at its output the short-circuit detection signal KS when the four trigger conditions B1 to B4 exist. When checking the trigger condition B4, the time delay by the delay element 22 is taken into account.

It will be assumed by way of example below that, at an instant t1, the short-circuit detection signal KS is generated and delivered to the timer 30. When the short-circuit detection signal KS is applied, the timer 30 is started, and generates a time value ZW at its output and delivers it to the elapse checking module 41 of the breaking module 40.

Besides the time value ZW, the short-circuit detection signal KS and the delay time value Tva, which has been generated by the time determination element 52 of the delay time determination module 50, are also applied to the elapse checking module 41.

The elapse checking module 41 generates at its output a breaking signal AS, with which disconnection of the generator 11 protected by the protective device 10 from the power supply network 12 connected thereto is brought about when the time value ZW is longer than the delay time value Tva of the time determination element 52 and when simultaneously the short-circuit detection signal KS is still present (see path 40a in FIG. 1). Otherwise, the loop for determination of the active power difference value ΔPa and the delay time value Tva is carried out again (see path 40b in FIG. 1).

The delay time value Tva which the time determination element 52 outputs is not constant but variable while the method is being carried out, or after short-circuit detection signal KS has been generated for the first time at the instant t1. Thus, with the aid of the characteristic f(ΔP) of the time determination element 52, it is possible to see that the delay value Tva is also changed in the event of a variation of the active power difference value ΔPa. The delay time value Tva is thus a function of the respective active power difference value ΔPa. Thus, if the active power, or the active power difference value ΔPa, varies in relation to the reference active power at the instant t1–Tn, then the delay time value Tva varies, which is in turn taken into account by the elapse checking module 41.

The function of the power change checking module 60 is to check, after generation of the short-circuit detection signal KS, whether a negative power change typical of a short circuit has occurred and the derivative value dP/dt has fallen below the predetermined negative threshold, or its magnitude has exceeded the magnitude of the negative threshold. If this is the case the power change checking module 60 allows the timer 30 to continue because it assumes that a short circuit has in fact occurred.

If the negative threshold is not fallen below by the derivative value dP/dt, then the change detection module 61 generates at its output, while taking the hysteresis defined by the hysteresis element HG into account, the stop signal SS with which the timer 30 is stopped and set to 0, because the change detection module 61 assumes that a short-circuit has not in fact occurred.

Figure 2:
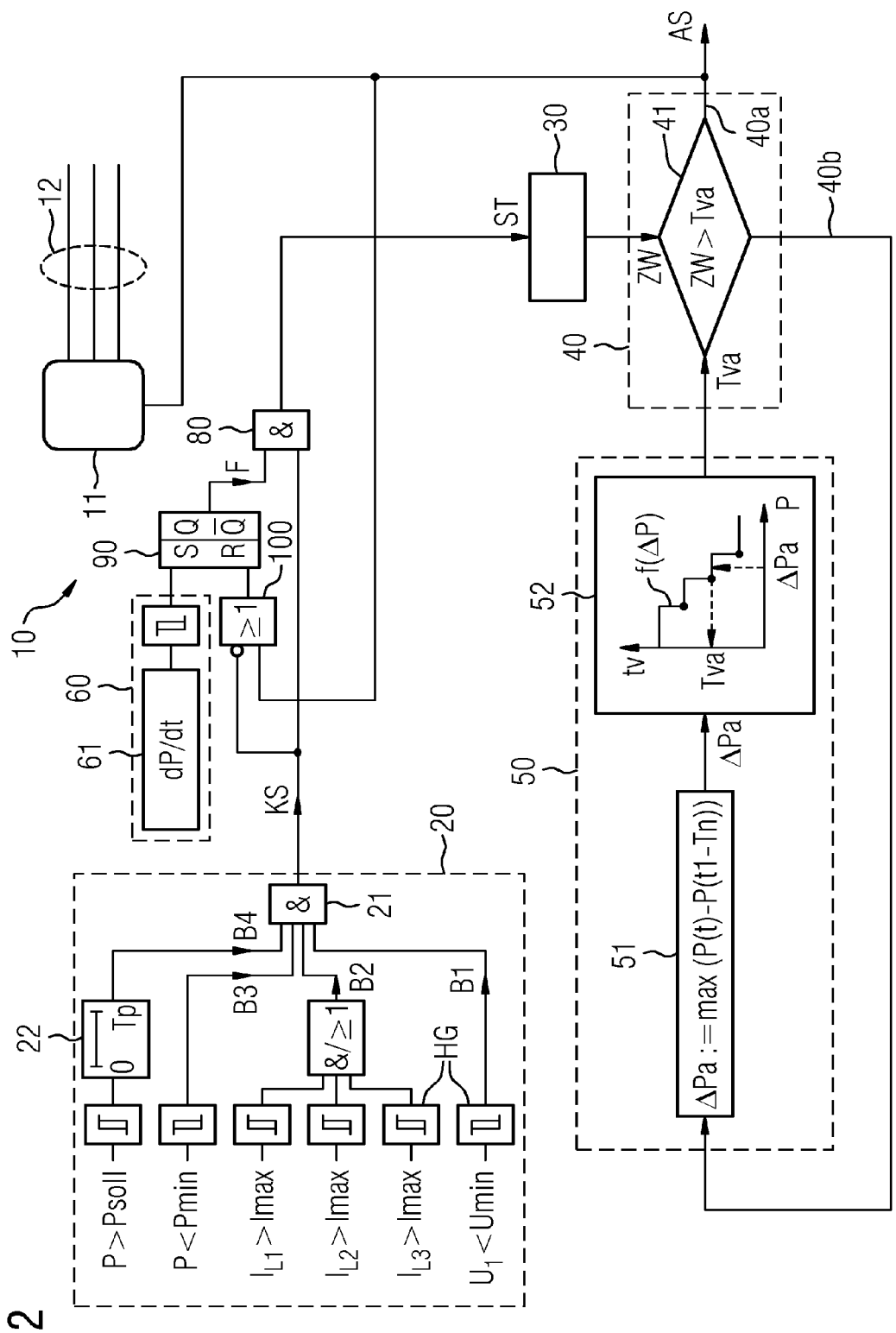
FIG. 2 is an illustration showing a second exemplary embodiment of the protective device according to the invention, with the aid of which a further exemplary embodiment of a protection method according to the invention will be explained.

FIG. 2 shows a second exemplary embodiment of a protective device 10, which may be used to protect an electrical generator 11 or power station unit connected to a power distribution network or to a power transmission line.

The protective device 10 contains the short-circuit detection module 20, the timer 30, the breaking module 40 and the delay time determination module 50, which may correspond to the corresponding modules in the protective device 10 according to FIG. 1. In this regard, reference is therefore made to the comments above in connection with FIG. 1.

In contrast to the protective device 10 according to FIG. 1, in the protective device 10 according to FIG. 2 the short-circuit detection module 20 is connected to the timer 30 not directly but only indirectly, and specifically by a logical AND element 80. The logical AND element 80 is connected at its input to the short-circuit detection module 20 and to a flip-flop 90.

The flip-flop 90 is preferably an RS flip-flop, which can be set or switched on by the power change checking module 60 arranged before it. When the flip-flop 90 is switched on, it generates at its output a logical flip-flop signal F with a logical one, which is applied to the input of the logical AND element 80.

Resetting of the flip-flop 90 may be carried out by an OR element 100, which is connected by means of an inverting input to the short-circuit detection module 20 and by a non-inverting input to the breaking module 40.

The protective device 10 according to FIG. 2 may be operated as now described.

If the short-circuit detection module 20 detects a short circuit, it generates at its output the short-circuit detection signal KS, which goes to the logical AND element 80. The logical AND element 80 checks whether the flip-flop signal F of the flip-flop 90 has a logical one. This would be the case if the power change checking module 60 had previously switched on the flip-flop 90.

Since the short-circuit detection signal KS is generated at the instant t1 and the power change checking module 60 only carries out the checking of the derivative value dP/dt with a delay at an instant after the instant t1, i.e. in a duration between t1 and t1+Tn or for example at the instant t1+Tn, the flip-flop 90 cannot yet be set when the short-circuit signal KS is generated. Accordingly, the logical AND element 80 initially does not forward the short-circuit signal KS, so that the timer 30 is likewise initially not started.

The starting of the timer 30 is carried out by the logical AND element 80 by means of a control signal ST only:
a) when the change detection module 61 has established a negative active power change and has accordingly set the flip-flop 90, and
b) when simultaneously the short-circuit detection signal KS is still present.

As soon the logical AND element 80 has started the timer 30, the latter generates the time value ZW which goes to the elapse checking module 41 of the breaking module 40. The elapse checking module 41 checks with the aid of the respective time value ZW whether or not the latter exceeds the delay time Tva output by the time determination element 52 of the delay time determination module 50. If this is the case, the breaking signal AS is generated at the output, otherwise this does not take place. The working procedure of the delay time determination module 50 according to FIG. 2 is preferably identical to the working procedure of the delay time determination module 50 according to FIG. 1.

In the exemplary embodiment according to FIG. 2, the breaking signal AS is also used for resetting the flip-flop 90 since the reset input of the flip-flop 90 is activated via the OR element 100 when the breaking signal AS is present. As soon as the flip-flop 90 has been reset, the control ST is switched off which leads to stopping or resetting of the timer 30.

Figure 3:
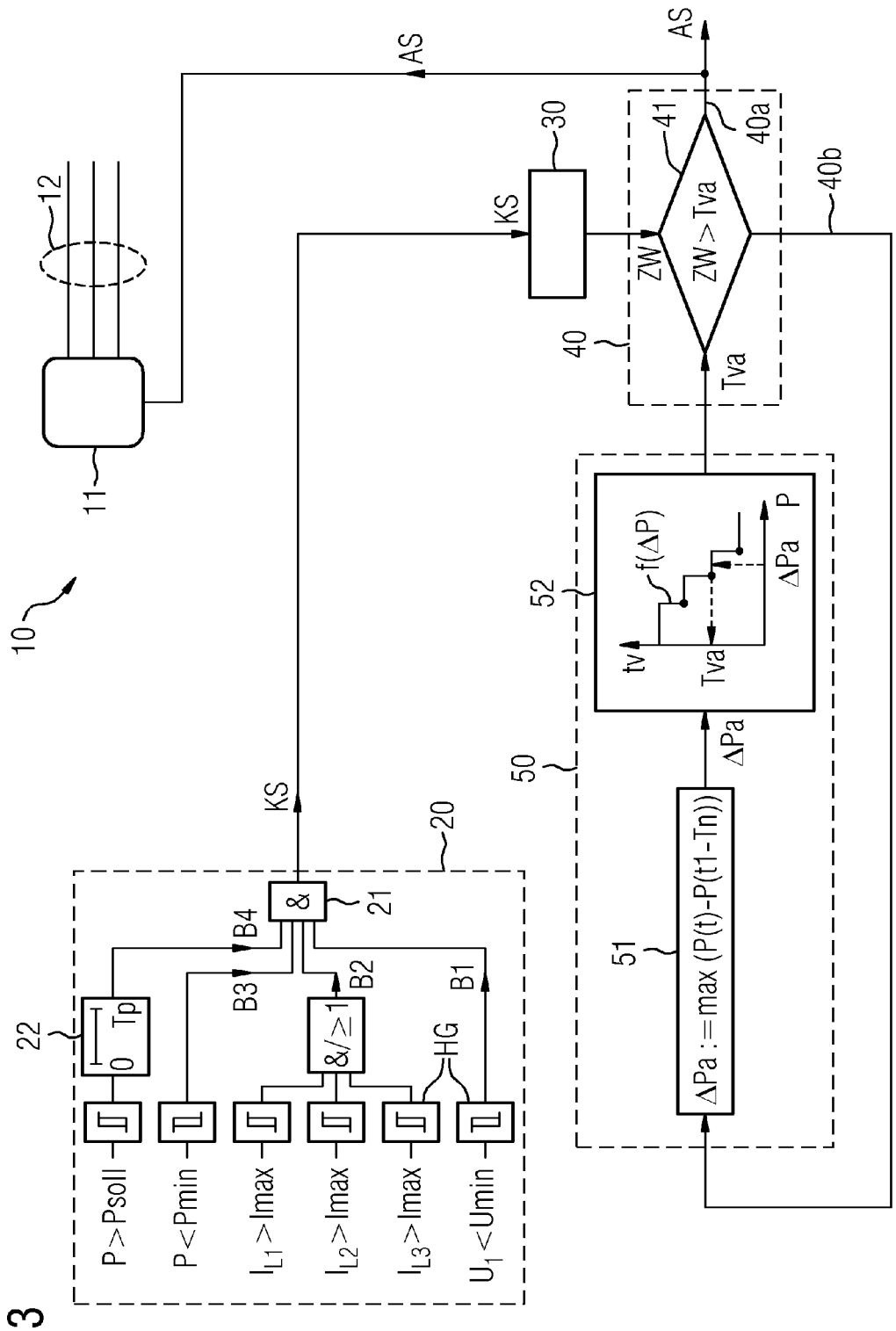
FIG. 3 is an illustration showing a third exemplary embodiment of the protective device according to the invention, in which a power change checking module is omitted.

FIG. 3 shows a third exemplary embodiment of a protective device 10, which may be used to protect an electrical generator 11 or power station unit connected to a power distribution network or to a power transmission line.

In the alternative embodiment according to FIG. 3, the power change checking module 60 is absent; the control of the timer is carried out only by means of the short-circuit detection module 20. So long as the short-circuit detection signal KS is present, the timer 30 is active and generates at its output an increasing time value ZW for the breaking module 40. When the short-circuit detection signal KS is absent, the timer 30 is reset.

In other regards, the comments in connection with FIG. 1 apply accordingly.

Figure 4:
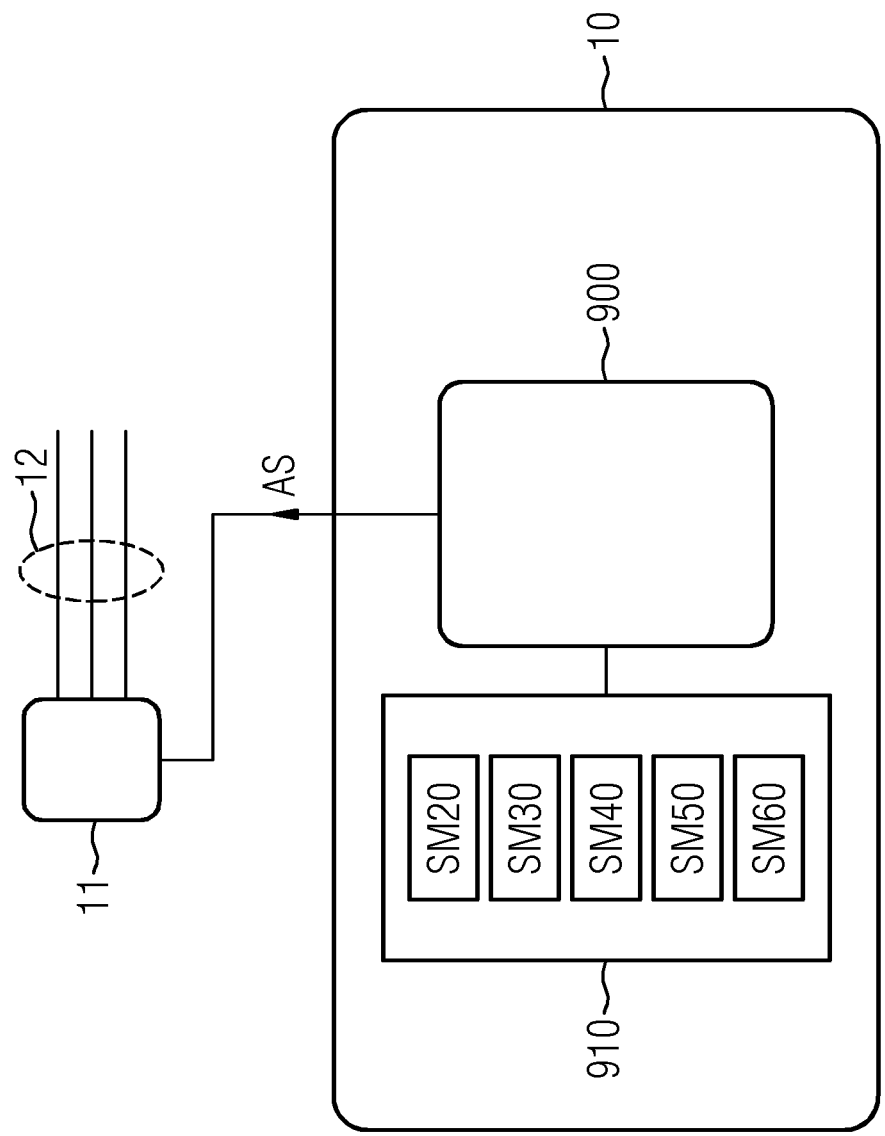
FIG. 4 is an illustration showing an exemplary embodiment of a protective device according to the invention, which contains a computing device.

FIG. 4 shows an exemplary embodiment of a protective device 10 according to the invention, which contains a computing device 900 and a memory 910. Software modules, with which the computing device 900 is programmed, are stored in the memory 910.

The short-circuit detection module 20, the timer 30, the breaking module 40, the delay time determination module 50 and the power change checking module 60 according to FIGS. 1 and 2 are formed in the exemplary embodiment according to FIG. 4 by software modules, which are denoted in FIG. 4 by the references SM20, SM30, SM40, SM50 and SM60.

Although the invention has been illustrated and described in detail by preferred exemplary embodiments, the invention is not restricted to the examples disclosed and other variants may be derived therefrom by the person skilled in the art without departing from the protective scope of the invention.

The following is a summary list of reference numerals and the corresponding structure used in the above description of the invention:
10 protective device
11 generator
12 power distribution network
20 short-circuit detection module
21 AND element
22 delay element
30 timer
31 start input
32 stop input
40 breaking module
40*a* path
40*b* path
41 elapse checking module
50 delay time determination module
51 differencing element
52 time determination element
60 power change checking module
61 change detection module
80 AND element
90 flip-flop
100 OR element 900 computing device
910 memory
AS breaking signal
B1 trigger condition
B2 trigger condition
B3 trigger condition
B4 trigger condition
dP/dt derivative value
F flip-flop signal
HG hysteresis elements
$I_{L1}$ phase current
$I_{L2}$ phase current
$I_{L3}$ phase current
Imax maximum phase current value
KS short-circuit detection signal
P active power
Pmin minimum active power value
Psoll active-power setpoint value
P(t) active power
P(t1–tn) active power
SM20 software module
SM30 software module
SM40 software module
SM50 software module
SM60 software module
SS stop signal
ST control signal
t time
t1 instant
t1–Tn instant
t1+Tn instant
Tn rigidly predetermined duration
Tp duration
Tva delay time
U1 positive-sequence voltage
Umin minimum positive-sequence voltage value
ZW time value
ΔPa active power difference value
f(ΔP) characteristic

The invention claimed is:

1. A protection method for protecting an electrical generator or power station unit connected to a power distribution network or to a power transmission line, which comprises the steps of:
   detecting a short circuit near the electrical generator or power station unit in the power distribution network or on the power transmission line;
   generating a short-circuit detection signal when a set of predetermined trigger conditions is satisfied;
   disconnecting the electrical generator or power station unit from the power distribution network or the power transmission line if, after generation of the short-circuit detection signal, the set of predetermined trigger conditions are satisfied at an instant when a predetermined delay time elapses, the predetermined delay time being a variable duration which is reestablished before it elapses, in dependence on an operating profile after a short-circuit occurrence.

2. The method according to claim 1, which further comprises:
   starting a timer when the short-circuit detection signal occurs, either immediately after an occurrence of the short-circuit detection signal or at a predetermined instant thereafter; and
   disconnecting the electrical generator from the power distribution network or the power transmission line if a time indication output by the timer corresponds to or exceeds the respectively currently established delay time and the set of predetermined trigger conditions are satisfied at this instant.

3. The method according to claim 1, which further comprises establishing the predetermined delay time in dependence on a respective power difference between power before detection of the short circuit and the power at a respective current instant.

4. The method according to claim 1, which further comprises establishing the predetermined delay time by applying or reading out a predetermined formula, a predetermined characteristic or a predetermined table which establishes a relationship between a difference value indicating a respective power difference or active power difference and the predetermined delay time corresponding thereto.

5. The method according to claim 1, which further comprises:
   starting the timer upon an occurrence of the short-circuit detection signal, and a stopping and/or a resetting of the timer is suppressed when, at a predetermined subsequent instant after generation of the short-circuit detection signal:
   the short-circuit detection signal is still present at the predetermined subsequent instant;
   an active power has in a meantime dropped by more than a predetermined extent; and
   otherwise the timer is stopped and/or reset.

6. The method according to claim 1, which further comprises:
   starting the timer with a delay, specifically at a predetermined subsequent instant after generation of the short-circuit detection signal, when:
   the short-circuit detection signal is still present at the predetermined subsequent instant;
   an active power has in a meantime dropped by more than a predetermined extent; and
   otherwise the timer is not started.

7. The method according to claim 1, wherein the set of the predetermined trigger conditions contains at least one of following trigger conditions:
   a trigger condition that a positive-sequence voltage falls below a minimum predetermined positive-sequence voltage value;
   a trigger condition that phase currents, or at least one thereof, respectively exceed a predetermined maximum phase current value;
   a trigger condition that an active power falls below a predetermined minimum active power value;
   a trigger condition that the active power has reached or exceeded a predetermined active-power setpoint value at a previous instant before an occurrence of at least one of the other trigger conditions; and
   a trigger condition that phase-to-phase voltages fall below a minimum voltage value.

8. The method according to claim 1, which further comprises establishing the predetermined delay time in dependence on a respective power difference between power before generation of the short-circuit detection signal and the power at a respective current instant.

9. The method according to claim 1, which further comprises establishing the predetermined delay time in dependence on a respective active power difference between an active power before generation of the short-circuit detection signal and the active power at a respective current instant.

10. The method according to claim 5, wherein the stopping and/or the resetting of the timer is suppressed when at the predetermined subsequent instant after generation of the short-circuit detection signal the active power has dropped by more than a derivative value indicating a mathematical time derivative of the active power in dependence on time that has fallen below a predetermined negative threshold value.

11. The method according to claim 6, wherein starting the timer with the delay, specifically at the predetermined subsequent instant after generation of the short-circuit detection signal, when the active power has dropped by more than the predetermined extent, namely a derivative value indicating a mathematical time derivative of the active power in dependence on time that has fallen below a predetermined negative threshold value.

12. The method according to claim 1, wherein the set of predetermined trigger conditions are satisfied when the set of predetermined trigger conditions have remained satisfied continuously during a duration of the predetermined delay time.

13. A protection method for protecting an electrical generator or power station unit connected to a power distribution network or to a power transmission line, which comprises the steps of:
  detecting a short circuit near the electrical generator or power station unit in the power distribution network or on the power transmission line;
  generating a short-circuit detection signal when a set of predetermined trigger conditions is satisfied;
  disconnecting the electrical generator or power station unit from the power distribution network or the power transmission line if, after generation of the short-circuit detection signal, the set of predetermined trigger conditions are satisfied at an instant when a predetermined delay time elapses, the predetermined delay time being a variable duration which is reestablished before it elapses, in dependence on an operating profile after a short-circuit occurrence; and
  establishing the predetermined delay time in dependence on a respective active power difference between an active power before detection of the short circuit and the active power at a respective current instant.

14. A protective device for protecting an electrical generator or power station unit connected to a power distribution network or to a power transmission line, the protective device comprising:
  a short-circuit detection module for detecting a short circuit in the power distribution network or on the power transmission line and generates a short-circuit detection signal when a set of predetermined trigger conditions is satisfied;
  a breaking module configured to disconnect the electrical generator or power station unit from the power distribution network or the power transmission line, or generate a breaking signal which initiates a disconnection, if, after generation of the short-circuit detection signal, the set of predetermined trigger conditions are satisfied at an instant when a predetermined delay time elapses;
  a delay time determination module configured to reestablish the predetermined delay time as a variable duration before it elapses, in dependence on an operating profile after the short-circuit occurrence.

15. The protective device according to claim 14, wherein:
  said protective device has a computing device; and
  said short-circuit detection module, said delay time determination module and said breaking module are software modules, with which said computing device is programmed.

16. A protective device for protecting an electrical generator or power station unit connected to a power distribution network or to a power transmission line, the protective device comprising:
  a short-circuit detection module for detecting a short circuit in the power distribution network or on the power transmission line and generates a short-circuit detection signal when a set of predetermined trigger conditions is satisfied;
  a breaking module configured to disconnect the electrical generator or power station unit from the power distribution network or the power transmission line, or generate a breaking signal which initiates a disconnection, if, after generation of the short-circuit detection signal, the set of predetermined trigger conditions are satisfied at an instant when a predetermined delay time elapses;
  a delay time determination module configured to reestablish the predetermined delay time as a variable duration before it elapses, in dependence on a respective active power difference between an active power before detection of the short circuit and the active power at a respective current instant after the short-circuit occurrence.

* * * * *